(12) United States Patent
Barber

(10) Patent No.: US 6,318,079 B1
(45) Date of Patent: Nov. 20, 2001

(54) HYDRAULIC CONTROL VALVE SYSTEM WITH PRESSURE COMPENSATED FLOW CONTROL

(75) Inventor: Dennis R. Barber, Oconomowoc, WI (US)

(73) Assignee: Husco International, Inc., Waukesha, WI (US)

(*) Notice: Subject to any disclaimer, the term of this patent is extended or adjusted under 35 U.S.C. 154(b) by 0 days.

(21) Appl. No.: 09/635,187

(22) Filed: Aug. 8, 2000

(51) Int. Cl.$^7$ .................................................. F16D 31/02
(52) U.S. Cl. .................................. 60/422; 60/489; 91/447
(58) Field of Search ........................... 60/422, 489, 493; 91/446, 447

(56) References Cited

U.S. PATENT DOCUMENTS

| | | | |
|---|---|---|---|
| 5,067,389 | 11/1991 | St. Germain | 91/446 |
| 5,138,837 | 8/1992 | Obertrifter et al. | 60/426 |
| 5,400,816 | 3/1995 | Gerstenberger | 137/106 |
| 5,579,642 | 12/1996 | Wilke et al. | 60/426 |
| 5,715,865 | 2/1998 | Wilke | 137/596 |
| 5,791,142 * | 8/1998 | Layne et al. | 91/446 |

* cited by examiner

Primary Examiner—Edward K. Look
Assistant Examiner—Thomas E. Lazo
(74) Attorney, Agent, or Firm—George E. Haas; Quarles & Brady LLP

(57) ABSTRACT

An assembly of valves controls hydraulic fluid flowing to several hydraulic actuators from a variable displacement pump that produces an output pressure equal to a control input pressure plus a predefined margin pressure. The control input pressure is a function of the greatest load pressure at the hydraulic actuators. Each valve has an associated pressure compensating valve which regulates the pressure differential across a metering orifice of each valve to a predefined level, usually the pump's margin pressure. A flow regulator is associated with at least one of the valves and reduces the output pressure from the pump to produce a reduced pressure that controls the associated pressure compensating valve. Operation of the flow regulator causes the pressure differential across a metering orifice of the associated valve to be less than the pump's margin pressure thus allowing adjustment of the fluid flow.

15 Claims, 3 Drawing Sheets

HYDRAULIC CONTROL VALVE SYSTEM WITH PRESSURE COMPENSATED FLOW CONTROL

FIELD OF THE INVENTION

The present invention relates to valve assemblies which control hydraulically powered machinery; and more particularly to pressure compensated valves wherein a fixed differential pressure is to be maintained to achieve a uniform flow rate.

BACKGROUND OF THE INVENTION

In a variety of machinery, working members are driven by hydraulic cylinders which are controlled by a reciprocal spool control valve. Such hydraulic systems are used to control multiple functions, such as raising and lowering the member, tilting or rotating the member around about an axis, and sliding the member fore and aft.

The speed of the hydraulically driven working member depends upon the cross-sectional area of principal narrowed orifices in the hydraulic system and the pressure drop across those orifices. To facilitate control, pressure compensating hydraulic control systems have been designed to set and maintain the pressure drop. These previous control systems include load sense (LS) lines which transmit the pressure at the valve workports to a control port of a variable displacement hydraulic pump which supplies pressurized hydraulic fluid in the system. In a multi-valve system the greatest workport pressure among the valves is applied to control the pump. The output pressure from this type of pump is the pressure at control port plus a constant pressure, known as the "margin." Thus the displacement of the pump varies in response to changes in the workport pressures that results from the loads on the working members.

Each valve section has a pressure compensator that responds to the pump output pressure and the control port pressure to ensure that the margin pressure appears across the valve's metering orifice even as the pump output pressure varies with load changes. Thus an approximately constant pressure drop is provided across the metering orifice whose cross-sectional area is controlled by the machine operator. This facilitates control because, with the pressure drop held constant, the speed of movement of the working member is determined only by the cross-sectional area of the orifice. This type of system is disclosed in U.S. Pat. No. 5,791,142 entitled "Hydraulic Control Valve System with Split Pressure Compensator", the disclosure of which is incorporated herein by reference.

Although the pressure compensator normally ensures that the pump's margin pressure appears across each valve, it is possible in some hydraulic systems to have a lower pressure across selected valves to reduce the flow. For example when controlling a hydraulic motor, the operator may wish to place the corresponding valve section in a fully open, detented position to provide continuous flow. However, it may be desired to limit that continuous flow to a rate less than that provided by the fully open position. Therefore, there is a need in some hydraulic systems to provide a compensated pressure differential across a metering orifice in selected valves which is less than the pump margin pressure.

Because the pressure compensator provides a constant flow, as determined by the metering area, the typical method to limit the flow rate is to put an additional orifice in series with the metering spool. This other orifice may be fixed to define the maximum flow or it may be adjustable so that the operator can select a desired flow. Another technique, with a spring operated pressure compensator, is to adjust the spring load mechanically while leaving the metering area constant. Both of these conventional methods require substantial mechanical devices with severe limitations as to their location in the valve assembly. Both also require sizeable springs to handle the relatively large loads that acts on them. The type of compensator referred to in the patent referenced above does not derive its control from a spring, but instead from a hydraulic signal, thus restricting the control options.

SUMMARY OF THE INVENTION

The present invention provides a flow compensator that reduces the pressure differential across a metering orifice in a specific valve of a multiple valve assembly.

A hydraulic system has a control valve with a variable metering orifice through which hydraulic fluid flows from a pump to an actuator connected to the control valve at a workport. The pump produces an output pressure that is a predefined amount greater than an input pressure at a control port and that input pressure is determined in response to pressure at the workport.

The hydraulic system is improved by a flow compensator that includes a pressure compensating valve which controls flow of fluid from the variable metering orifice and the workport in response to a differential in pressures acting on opposite first and second sides of the pressure compensating valve, wherein the first side receives a pressure produced by the variable metering orifice.

A flow regulator is connected to the output of the pump and reduces the output pressure from the pump to produce a reduced pressure that is applied to the second side of the pressure compensating valve. Thus the pressure compensating valve is controlled by a pressure that is less than the pressure at the control port of the pump. This results in the pressure differential across the variable metering orifice of the control valve equaling the reduced pressure.

In the preferred embodiment, the flow regulator is a valve that controls flow of fluid between the output of the pump and the second side of the pressure compensating valve in response to a pressure from the output of the pump acting to open the flow regulator valve, the pressure at the second side of the pressure compensating valve acting to close the flow regulator valve, and a biasing element that also acts to close the flow regulator valve. The biasing elements preferably is adjustable to set the resultant pressure differential across the metering orifice to a desired value.

Thus the flow compensator enables the metering orifice pressure differential to be set to a lower pressure than the pump margin pressure. The present technique provides a variable pressure differential in order to control the maximum flow rate. In addition, the metering gain is reduced across the entire metering range, unlike most flow controls which only limit the maximum flow.

DETAILED DESCRIPTION OF THE INVENTION

Figure 1:
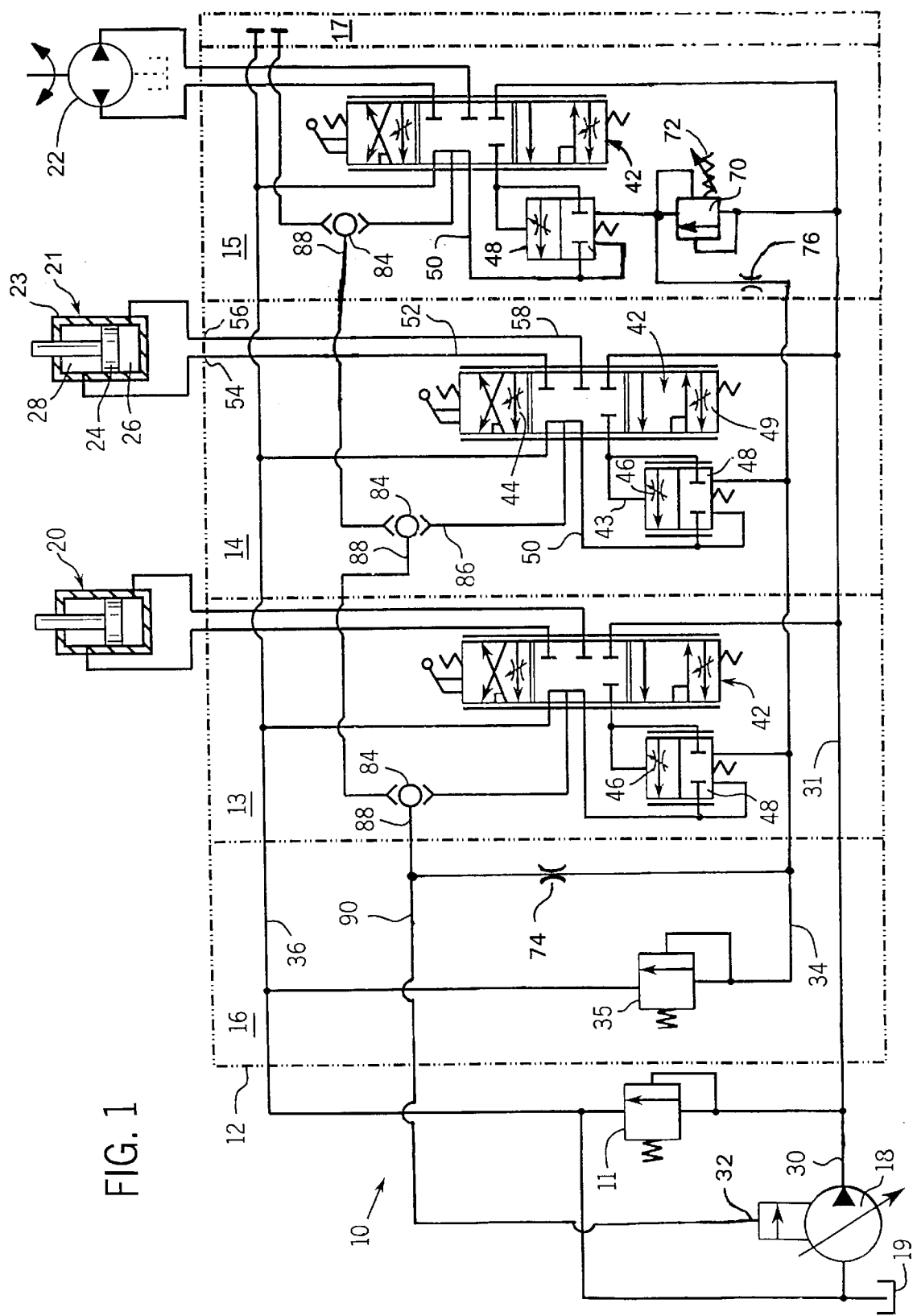
FIG. 1 is a schematic diagram of a hydraulic system having a multiple valve assembly which incorporates a novel pressure compensated flow control.

FIG. 1 schematically depicts a hydraulic system 10 having a multiple valve assembly 12 which controls all motion of hydraulically powered working members of a machine, such as the boom and bucket of a backhoe. The valve assembly 12 is formed by several individual valve sections 13, 14 and 15 connected side-by-side between two end sections 16 and 17. A given valve section 13, 14 or 15 controls the flow of hydraulic fluid from a pump 18 to one of several actuators 20, 21 and 22, respectively, connected to the working members and controls the return of the fluid to a reservoir or tank 19.

Actuators 20 and 21 have a cylinder housing 22 containing a piston 24 that divides the housing interior into a bottom chamber 26 and a top chamber 28. References herein to directional relationships and movement, such as top and bottom or up and down, refer to the relationship and movement of the components in the orientation illustrated in the drawings, which may not be the orientation of the components in a particular application. Actuator 22 is a conventional bidirectional hydraulic motor with the direction of rotation being controlled by the third valve section 15.

The pump 18 typically is located remotely from the valve assembly 12 and is connected by a conduit or hose 30 to a supply passage 31 extending through the valve assembly 12. The output of the pump is protected by a pressure relief valve 11. The pump 18 is a variable displacement type whose output pressure is designed to be the sum of the pressure at a displacement control input port 32 plus a constant pressure, known as the "margin." The control port input is connected to a transfer passage 34 that extends through the sections 13–15 of the valve assembly 12.

A reservoir passage 36 also extends through the valve assembly 12 and is coupled to the tank 19. End section 16 of the valve assembly 12 contains ports for connecting the supply passage 31 to the pump 18 and the reservoir passage 36 to the tank 19. This end section 16 also includes a pressure relief valve 35 that relieves excessive pressure in the pump control transfer passage 34 to the tank 19. The other end section 17 has a port by which the transfer passage 34 is connected to the control input port of pump 18.

To facilitate understanding of the invention claimed herein, it is useful to describe basic fluid flow paths with respect to one of the valve sections 14 in the illustrated embodiment. Each of the valve sections 13–15 in the assembly 12 operates similarly, and the following description is applicable them.

Figure 2:
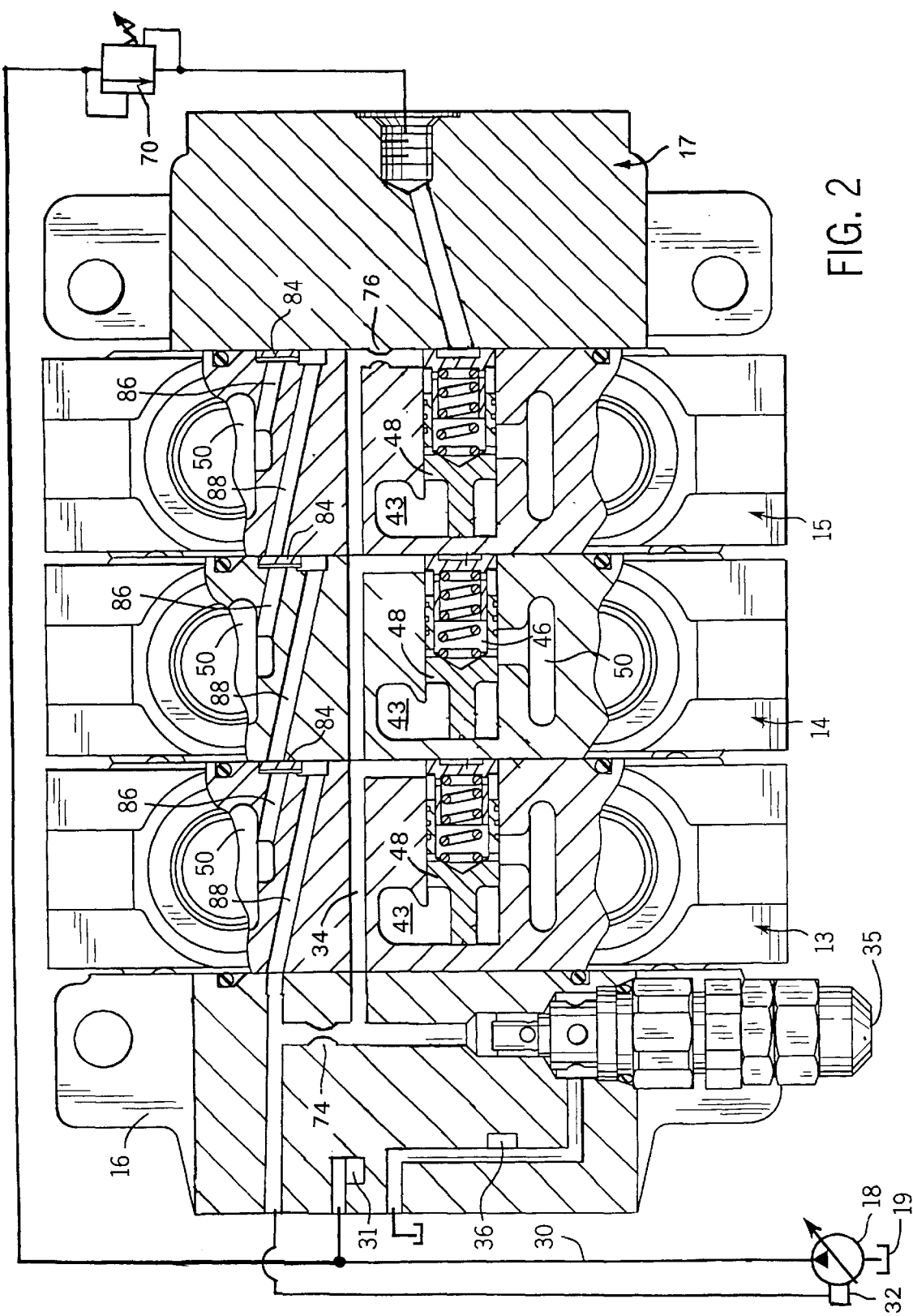
FIG. 2 is a cross-sectional view through the multiple valve assembly which is shown schematically connected to a pump and a tank.
Figure 3:
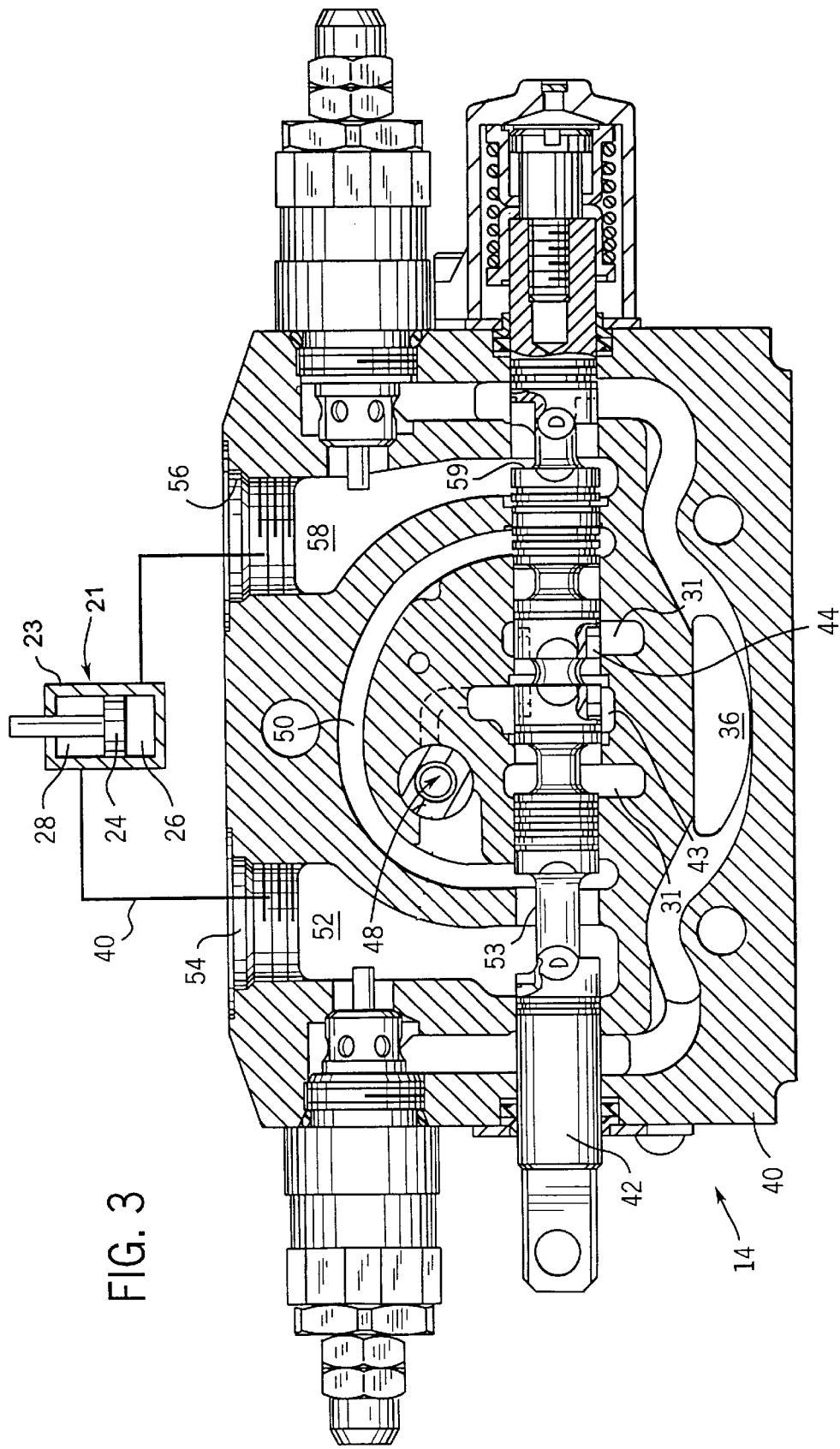
FIG. 3 is an orthogonal cross-sectional view through one section of the multiple valve assembly in FIG. 2 and schematically shows connection to a hydraulic cylinder.

With additional reference to FIGS. 2 and 3, the valve section 14 has a body 40 and control spool 42 which a machine operator can move in either reciprocal direction within a bore in the body by operating a control member that may be attached thereto, but which is not shown. Depending on which way the control spool 42 is moved, hydraulic fluid is directed to the bottom or top chamber 26 and 28 of a cylinder housing 22 and thereby drives the piston 24 up or down, respectively. The extent to which the machine operator moves the control spool 42 determines the speed of a working member connected to the piston 24.

To lower the piston 24, the machine operator moves the control spool 42 rightward into the position illustrated in FIG. 3. This opens passages which allow the pump 18 (under the control of the load sensing network to be described later) to draw hydraulic fluid from the tank 19 and force the fluid through pump output conduit 30, into a supply passage 31 in the body 40. From the supply passage 31 the hydraulic fluid passes through a metering orifice formed by a set of notches 44 of the control spool 42, through feeder passage 43 and through a variable orifice 46 (see FIG. 2) formed by the relative position between a pressure compensating check valve 48 and an opening in the body 40 to the bridge passage 50. In the open state of pressure compensating check valve 48, the hydraulic fluid travels through a bridge passage 50, a passage 53 of the control spool 42 and then through workport passage 52, out of work port 54 and into the upper chamber 28 of the cylinder housing 22. The pressure thus transmitted to the top of the piston 24 causes it to move downward, which forces hydraulic fluid out of the bottom chamber 26 of the cylinder housing 22. This exiting hydraulic fluid flows into another workport 56, through the workport passage 58, the control spool 42 via passage 59 and the reservoir passage 36 that is coupled to the fluid tank 19.

To move the piston 24 upward, the machine operator moves control spool 42 to the left in FIG. 2, which opens a corresponding set of passages so that the pump 18 forces hydraulic fluid into the bottom chamber 26 of cylinder housing 22, causing piston 24 to move upward. The piston movement also pushes fluid out of the top cylinder chamber 28 and through the valve assembly 14 to the tank 19.

In the absence of a pressure compensation mechanism, the machine operator would have difficulty controlling the speed of the piston 24. The difficulty results from the speed of piston movement being directly related to the hydraulic fluid flow rate, that is determined primarily by two variables—the cross sectional areas of the most restrictive orifices in the flow path and the pressure drops across those orifices. One of the most restrictive orifices is the metering notch 44 of the control spool 42 and the machine operator is able to control the cross sectional area of that orifice by moving the control spool. Although this controls one variable which helps determine the flow rate, it provides less than optimum control because flow rate is also directly proportional to the square root of the total pressure drop in the system, which occurs primarily across metering notch 44 of the control spool 42. For example, adding material into the bucket of a backhoe increases pressure in the bottom cylinder chamber 26, which reduces the difference between that load pressure and the pressure provided by the pump 18. Without pressure compensation, this reduction of the total pressure drop decreases the fluid flow rate, thereby reducing the speed of the piston 24, even if the machine operator holds the metering notch 44 at a constant cross sectional area.

To over come this problem, the valve assembly 10 incorporates a pressure compensation mechanism which senses pressure at the powered workport of each valve section 13–15, and selects the greatest of these workport pressures to be applied to the displacement control input port 32 of the hydraulic pump 18. The greatest workport pressure also is applied to the pressure compensating check valve 48 in each valve section 13–15. This type of pressure compensating mechanism is described in U.S. Pat. No. 5,791,142, the description of which is incorporate herein by reference.

The workport pressure selection is performed by a load sense circuit 80 formed by a chain of shuttle valves 84 in a valve sections 13 and 14. Referring also to the exemplary valve section 14 shown in FIGS. 1 and 2, its shuttle valve 84 has two inputs: (a) from the bridge 50 (via shuttle passage 86) and (b) connected to a through passage 88 leading from the upstream valve section 15. That through passage carries the greatest of the powered workport pressure in the valves sections that are upstream from valve section 14. The bridge 50 is at the pressure in whichever workport 54 or 56 is powered in valve section 14, or in the reservoir passage 36 when the control spool 42 is centered in neutral. The shuttle valve 84 operates to transmit the greater of the pressures at inputs (a) and (b) via its section's through passage 88 to the shuttle valve of the adjacent downstream valve section 13. It should be noted that the farthest upstream valve section 15 in the chain need not have a shuttle valve 84 as only its load pressure will be sent to the next valve section 14 via passage 88. However, all valve sections 13–15 are identical for economy of manufacture.

The through passage 88 of the farthest downstream valve section 13 in the chain of shuttle valves 84 communicates via passage 90 in end section 16 with the control input port 32 of the pump 18. Therefore, the greatest of all the powered workport pressures in the valve assembly 12 is transmitted to control the pump's displacement and thus regulates the output pressure of the pump.

The transfer passage 34 also carries the isolator output pressure to one side of each pressure compensating check valve 48. In order for hydraulic fluid to flow from the pump 18 to the powered workport 54 or 56, the variable orifice 46 through the associated pressure compensating check valve 48 must be at least partially open. This occurs when the pump output pressure in supply passage 31 is greater than the workport pressure in the given valve section 14 and greater than the pressure in transfer passage 34. This the pressure differential between these pressures that act on the pressure compensating check valve 48 is applied across the metering orifice and determines the flow rate of fluid through valve sections 13 and 14.

The third valve section 15 is different as it includes a flow regulator valve 70. The flow regulator valve 70 is a relief valve, as shown schematically in the drawings, which has substantially equal surface area on both sides so that the pressures applied to those sides will affect movement of the valve element equally. In the actual implementation of the present invention, a sequence type valve was employed by connecting the spring chamber to the downstream pressure. The pressure in the transfer passage 34 which controls the pump 16 is applied to the inlet of the flow regulator valve 70 and to a first side of the flow regulator valve where that pressure urges the valve spool toward the open position. The outlet of the flow regulator valve 70 is connected to one side of the pressure compensating check valve 48 to urge that latter valve toward a closed position. An orifice 76 couples the flow regulator valve outlet to transfer passage 34 which references the pressure to the greatest workport pressure produced in that passage. This connection ensures that the pressure differential across the metering orifice of the spool 42 will be constant as there always will be a constant difference between the pressure in the transfer passage 34 and the pump output pressure. The outlet of flow regulator valve 70 also is coupled to that valve's second side which is opposite the first side. That second side also is biased by an adjustable spring 72. Adjustment of the spring defines the pressure threshold at which the flow regulator valve 70 opens and thus the pressure that is applied to the pressure compensating check valve 48 as will be described.

The flow regulator valve 70 reduces the pump pressure in supply passage 31 to a level that is predefined by the setting of the adjustable spring 72. The resultant pressure controls the operation of the pressure compensating check valve 48 so that the pressure drop across the metering orifice of the valve section equals the pressure level set by the flow regulator valve 70. Thus the pressure drop is less than the pump margin pressure that appears across the metering orifice of the other valve sections 13 and 14. As a result is the pump margin decreases for some reason, such as due to fluid viscosity or temperature variation, the pressure defined by the flow regulator valve 70 will continue to be applied to the pressure compensating check valve 48 unless the margin pressure drops below the pressure setting of the flow regulator valve 70. Until that happens the full range of the normal fluid flow will be available at the third valve section 15.

What is claimed is:

1. In a hydraulic system having a control valve with variable metering orifice through which hydraulic fluid flows between a pump to an actuator connected to the control valve at a workport, the pump being of the type which produces an output pressure at an outlet that is a predefined amount greater than an input pressure at a control port, and the input pressure is determined in response to a pressure at the workport; a flow compensator comprising:

a pressure compensating valve controlling flow of fluid from the variable metering orifice and the workport in response to a differential in pressures acting on opposite first and second sides of the pressure compensating valve, wherein the first side receives a pressure produced by the variable metering orifice; and a flow regulator connected to the output of the pump and reducing the output pressure to produce a reduced pressure that is applied to the second side of the pressure compensating valve.

2. The flow compensator as recited in claim 1 wherein the flow regulator comprises a flow regulator valve that controls flow of fluid between the output of the pump and the second side of the pressure compensating valve in response to a differential between the output pressure from the pump and pressure at the second side of the pressure compensating valve, and in response to force from a biasing element that also acts on the flow regulator valve.

3. The flow compensator as recited in claim 1 wherein the flow regulator comprises a flow regulator valve that controls flow of fluid between the output of the pump and the second side of the pressure compensating valve in response to a differential between the output pressure from the pump and force from a biasing element that acts on the flow regulator valve.

4. The flow compensator as recited in claim 3 wherein the flow regulator valve is a pressure relief valve.

5. The flow compensator as recited in claim 3 wherein the biasing element is adjustable to vary the force acting on the flow regulator valve.

6. The flow compensator as recited in claim 1 wherein the flow regulator is adjustable to vary the reduced pressure.

7. The flow compensator as recited in claim 1 further comprising an orifice coupling the second side of the pressure compensating valve to the control port of the pump.

8. In a hydraulic system having a control valve with variable metering orifice through which hydraulic fluid flows from a pump to an actuator connected to the control valve at a workport, the pump producing an output pressure at an output that is a predefined amount greater than an input pressure at a control port, and the input pressure is determined in response to a pressure at the workport; a flow compensator comprising:

a pressure compensating valve controlling flow of fluid between the variable metering orifice and the workport in response to a differential in pressures acting on opposite first and second sides of the pressure compensating valve, wherein the first side receives a pressure produced by the variable metering orifice; and a flow regulator valve controlling flow of fluid between the output of the pump and the second side of the pressure compensating valve in response to a pressure from the output of the pump acting to open the flow regulator valve, the pressure at the second side of the pressure compensating valve acting to close the flow regulator valve, and a biasing element that also acts to close the flow regulator valve.

9. The flow compensator as recited in claim 8 further comprising an orifice coupling the second side of the pressure compensating valve to the control port of the pump.

10. The flow compensator as recited in claim 8 wherein the biasing element is adjustable to vary a force applied to the flow regulator valve.

11. In a hydraulic system having an array of control valve sections for controlling flow of hydraulic fluid from a pump to a plurality of actuators, each control valve section has a workport to which one actuator connects and having a metering orifice through which the hydraulic fluid flows from the pump to the workport, the pump produces an output pressure that is a predefined amount greater than a pressure at a control port, the array of control valve sections being of the type in which the greatest pressure among the workports is sensed to provide a load sense pressure that is transmitted to the control port; at least one of the control valve sections having a flow compensator comprising:

a pressure compensating valve controlling flow of fluid between the variable metering orifice and the workport in response to a differential in pressures acting on opposite first and second sides of the pressure compensating valve, wherein the first side receives a pressure produced by the variable metering orifice; and a flow regulator valve controlling flow of fluid between the output of the pump and the second side of the pressure compensating valve in response to a pressure from the output of the pump acting on one side of the flow regulator valve, the pressure at the second side of the pressure compensating valve acting on another side of the flow regulator valve, and as biasing element that also acts on the another side of the flow regulator valve.

12. The flow compensator as recited in claim 11 further comprising an orifice coupling the second side of the pressure compensating valve to the control port of the pump.

13. The flow compensator as recited in claim 11 further comprising an orifice coupling the second side of the pressure compensating valve to the load sense pressure.

14. The flow compensator as recited in claim 11 wherein the biasing element is adjustable to vary a force applied to the other side of the flow regulator valve.

15. The flow compensator as recited in claim 11 wherein the biasing element is adjustable spring which varies a force applied to the other side of the flow regulator valve.

* * * * *